United States Patent
Thorsen

(10) Patent No.: US 12,537,381 B2
(45) Date of Patent: Jan. 27, 2026

(54) DATA COLLECTION SYSTEM AND METHOD FOR RENEWABLE ENERGY POWER PLANT

(71) Applicant: VESTAS WIND SYSTEMS A/S, Aarhus N. (DK)

(72) Inventor: Morten Tim Thorsen, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 384 days.

(21) Appl. No.: 18/014,301

(22) PCT Filed: Jun. 3, 2021

(86) PCT No.: PCT/DK2021/050178
§ 371 (c)(1),
(2) Date: Jan. 3, 2023

(87) PCT Pub. No.: WO2022/002324
PCT Pub. Date: Jan. 6, 2022

(65) Prior Publication Data
US 2023/0261474 A1    Aug. 17, 2023

(30) Foreign Application Priority Data
Jul. 2, 2020    (DK) .......................... PA 2020 70449

(51) Int. Cl.
*H02J 3/38*    (2006.01)
(52) U.S. Cl.
CPC ........... *H02J 3/381* (2013.01); *H02J 2300/20* (2020.01)
(58) Field of Classification Search
CPC .... H02J 3/381; H02J 2300/20; G05B 23/0264
See application file for complete search history.

(56) References Cited

U.S. PATENT DOCUMENTS

| 6,106,176 A | * | 8/2000 | Yanagisawa | B41J 19/202 400/279 |
| 6,421,080 B1 | * | 7/2002 | Lambert | H04N 7/181 348/E7.086 |

(Continued)

FOREIGN PATENT DOCUMENTS

EP    2131038 A2    12/2009

OTHER PUBLICATIONS

European Patent Office, Communication pursuant to Article 94(3) EPC for European Patent Application No. 21733371.5, mailed May 10, 2024.

(Continued)

*Primary Examiner* — Ziaul Karim
(74) *Attorney, Agent, or Firm* — Patterson + Sheridan, LLP; Gero G. McClellan

(57) ABSTRACT

Aspects of the present invention relate to a data collection system for a renewable energy power plant comprising a plurality of renewable energy generators. The system comprises a temporary data store in communication with the generators. The temporary data store is configured to: receive a stream of data from at least two of the generators; and temporarily store the received data. The system comprises a permanent data store for storing data for subsequent analysis. The system comprises a processor in communication with the temporary and permanent data stores and a plurality of trigger sources. The processor is configured to, in response to receiving a trigger signal from one of the plurality of trigger sources, cause temporarily-stored data from the temporary data store to be stored in the permanent data store.

16 Claims, 3 Drawing Sheets

(56) References Cited

U.S. PATENT DOCUMENTS

| | | | | |
|---|---|---|---|---|
| 8,230,266 | B2* | 7/2012 | Hamby | F03D 7/0224 |
| | | | | 714/39 |
| 8,451,134 | B2* | 5/2013 | Bharadwaj | F03D 17/00 |
| | | | | 702/182 |
| 10,063,061 | B2* | 8/2018 | Bartsch | F03D 7/0284 |
| 10,865,772 | B2* | 12/2020 | Baba | F03D 80/50 |
| 2006/0092043 | A1* | 5/2006 | Lagassey | G07C 5/0891 |
| | | | | 340/907 |
| 2008/0281485 | A1* | 11/2008 | Plante | H04N 21/4223 |
| | | | | 701/33.4 |
| 2012/0093647 | A1* | 4/2012 | Bengtson | G05B 23/0237 |
| | | | | 416/61 |
| 2013/0201316 | A1* | 8/2013 | Binder | G07C 3/02 |
| | | | | 701/2 |
| 2015/0039269 | A1* | 2/2015 | Mejegard | H04W 4/80 |
| | | | | 702/182 |
| 2018/0004688 | A1* | 1/2018 | Chung | G06F 13/4068 |
| 2019/0389307 | A1 | 12/2019 | Plante et al. | |

OTHER PUBLICATIONS

International Search Report and Written Opinion for PCT Application No. PCT/DK2021/050178, dated Aug. 30, 2021.

Search Opinion for Danish Patent Application No. 2020 70449, dated Dec. 12, 2020.

\* cited by examiner

DATA COLLECTION SYSTEM AND METHOD FOR RENEWABLE ENERGY POWER PLANT

TECHNICAL FIELD

The present disclosure relates to a system and method for collecting and storing data signals for a renewable energy power plant.

BACKGROUND

Wind power plants having a plurality of wind turbine generators are becoming increasingly common in power networks. The success of wind power plants relies on their continued integration with power networks and their adherence to requirements as dictated by network operators. In addition to ensuring that wind power plants are configured and controlled appropriately to meet the requirements during normal operation, it is also important to provide those power plants with suitable functionality to respond to unexpected events.

Conventional wind power generators are operated by a controller. If an unexpected event occurs within the generator, such as a temperature spike or electrical anomaly, the controller is configured to log relevant high frequency data from sensors within the wind turbine generator for subsequent rootcause analysis. This data may be sent to a central power plant controller for analysis.

However, this approach only logs data in response to events within the wind turbine generator. There is currently no way to efficiently log data from the power plant for external events. It is an aim of the present invention to address one or more of the disadvantages associated with the prior art.

SUMMARY OF THE INVENTION

According to an aspect of the present invention there is provided a data collection system for a renewable energy power plant comprising a plurality of renewable energy generators. The system comprises a temporary data store in communication with the renewable energy generators. The temporary data store is configured to: receive a stream of data from at least two of the plurality of renewable energy generators; and temporarily store the received data. The system comprises a permanent data store for storing data for subsequent analysis. The system comprises a processor in communication with the temporary and permanent data stores and a plurality of trigger sources. The processor is configured to, in response to receiving a trigger signal from one of the plurality of trigger sources, cause temporarily-stored data from the temporary data store to be stored in the permanent data store.

The temporary data store and the permanent data store may alternatively be referred to as first data store and second data store respectively.

Advantageously, the provision of a temporary data store in communication with different data sources and from which data is taken in response to trigger signals permits the storage of data from across different generators in response to an event related to the plant's operation. In doing so, more data relevant to the event that caused the signal can be gathered than has ordinarily been possible. The provision of a temporary data store and a permanent data store results in a lower storage cost than may otherwise be possible-data stored permanently is only data selected specifically due to a trigger, so no storage is wasted.

The temporary data store may be in communication with one or more sensors of the renewable energy power plant, the one or more sensors being separate from the renewable energy generators, and the temporary data store may be configured to receive a stream of data from the one or more sensors.

The temporary data store may be configured to continuously receive the streams of data. The temporary data store may comprise at least one buffer. The temporary data store may comprise a buffer for each data source from which data is received by the temporary data store. The temporary data store may comprise a buffer for each data stream received by the temporary data store. The generators may be considered to be a data source. A set of sensors may be considered to be a data source. A single sensor may be considered to be a data source.

The temporary data store may be configured to store the data at the same temporal resolution as it is received.

The processor may be configured to cause data to be stored in the permanent data store at the same temporal resolution as it is stored in the temporary data store.

The temporary data store may be configured to store metadata with the data. The metadata may comprise a data timestamp.

The trigger signal may comprise an event timestamp, and the processor may be configured to determine an event period based on the event timestamp and cause data from the temporary data store having a data timestamp within the event period to be stored in the permanent data store.

The event period may comprise timestamps from before and after the event timestamp.

The metadata may comprise a data identifier with the data, the data identifier enabling identification of the source of the data and/or the data type.

The processor may be configured to cause the data to be stored in the second data store as a data track.

The trigger signal may comprise an event identifier. The processor may be configured to determine one or more data identifiers based on the event identifier and cause data from the temporary data store having the determined data identifiers to be stored in the permanent data store.

Optionally, the processor, temporary data store, and permanent data store are separate entities.

The trigger source optionally comprises one of: a renewable energy generator; a renewable energy power plant sensor; a connecting network sensor; a controller; an external power network sensor, a non-data-producing device; or the data collection system.

According to an aspect of the invention, there is provided a power plant controller comprising the data collection system described above.

According to an aspect of the invention, there is provided a method for gathering data from a renewable energy power plant. The method comprises the steps of receiving high-frequency data from a plurality of data sources within the wind power plant; temporarily storing the high-frequency data; and, in response to receiving a trigger signal relating to an event, permanently storing temporarily stored data relevant to the event for subsequent analysis.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Generally the invention of this application relates to a data collection system and a method of its operation for a renewable energy power plant. The system, a centralised system separate from other components within the power plant, has two data stores, one for temporary storage and one for more permanent storage, and a processor. The temporary storage data store receives a stream of data from sensors within a wind power plant and temporarily stores them in a manner accessible to the processor. The processor, acting in response to an event indicated by a trigger, accesses the temporary data store and transfers data that is relevant to the event between the data stores so that the data is stored in a less temporary manner. This system beneficially increases the amount of data captured for an event, thereby improving the quality of the analysis of the cause of the event and the aftermath. The system also permits data from a multitude of different data sources to be captured, so that the wider picture can be gathered. Additionally, the system enables many more triggers to be used to gather data than has conventionally been possible. These are important aspects for root cause analysis and compliance reporting. Many other advantages stem from the system and method described herein, and will be described below in relation to the features from which they arise.

Figure 1:
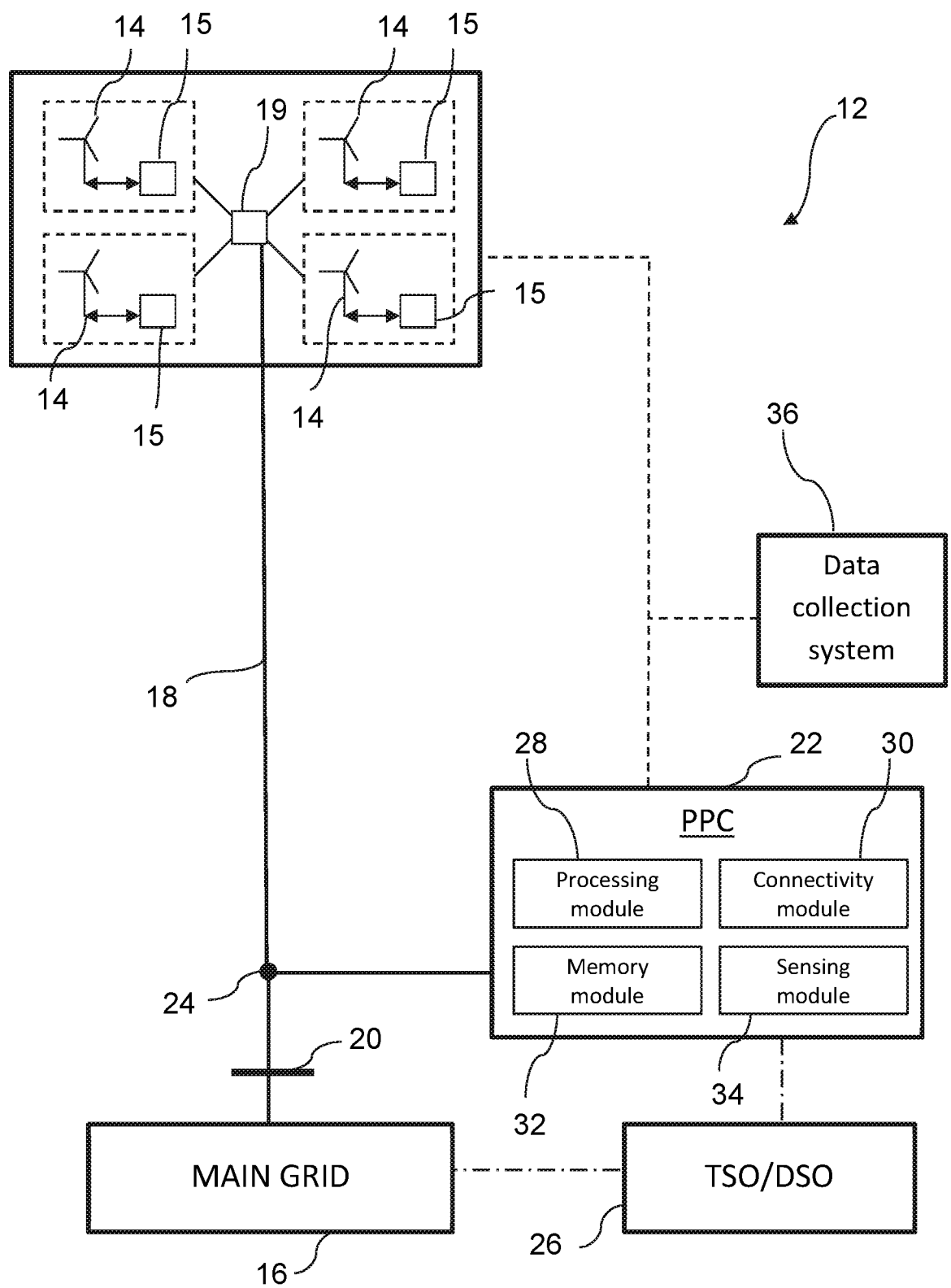
FIG. 1 shows a schematic representation of a wind power plant connected to a power network.

FIG. 1 illustrates a typical architecture in which a wind power plant (WPP), which may also be referred to as a wind park or wind farm, is connected to a main grid as part of a wider power network. As will be understood by the skilled reader, a WPP comprises at least one wind turbine generator (WTG), and is also known as a wind park or a wind farm. A WTG is commonly referred to as a wind turbine. The examples shown are representative only and the skilled reader will appreciate that other specific architectures are possible, in relation to both wind power plants, power plants for other renewable energy sources such as solar power plants, wind turbine generators and other renewable energy generating sources. Thus, the invention also relates to renewable energy power plants and renewable energy generators in general, rather than being specific to wind power plants and generators as in the Figures. In addition, the skilled reader will appreciate that methods, systems and techniques also described below may be applicable to many different configurations of power network. Moreover, the components of the wind power plant and power network are conventional and as such would be familiar to the skilled reader. It is expected that other known components may be incorporated in addition to or as alternatives to the components shown and described in FIG. 1. Such changes would be within the capabilities of the skilled person.

FIG. 1 shows a power network 19 incorporating a WPP 12 and a power plant controller 22 (PPC). The WPP 12 includes a plurality of WTGs 14. Each of the plurality of WTGs 14 converts wind energy into electrical energy, which is transferred from the WPP 12 to a main transmission network or main grid 16, as active power and/or current, for distribution.

Although not illustrated in this Figure, the WPP 12 may also include compensation equipment, such as a static synchronous compensator (STATCOM), configured to provide reactive power or reactive current support as required.

Each of the WTGs 14 is associated with a respective WTG controller 15. In some examples, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current and/or power requests received from the PPC 22. During extraordinary conditions, the WTG controllers 15 operate to fulfil predetermined network requirements, and also act to protect the WTGs 14 from any potentially harmful conditions.

The WPP 12 is connected to the main grid 16 (also called the main power network) by a connecting network 18. The WPP 12 and the main grid 16 are connected at a Point of Interconnection (PoI) 20, which is an interface between the WPP 12 and the main grid 16.

The WTGs 14 are connected to one another locally by local grid 19, (also called the local power network or park grid). The function of the local grid is to channel power from each of the WTGs 14 to the connecting network 18 to the main grid 16.

The Power Plant Controller (PPC) 22 is connected to the main grid 16 at a Point of Measurement (POM) 24 and is connected to the WTG controllers 15. The role of the PPC 22 is to act as a command and control interface between the WPP 12 and the grid 16, and more specifically, between the WPP 12 and a grid operator, such as a transmission system operator (TSO) or a distribution system operator (DSO) 26. The PPC 22 is a suitable computer system for carrying out the controls and commands as described above and so incorporates a processing module 28, a connectivity module 30, a memory module 32 and a sensing module 34. The PPC 22 may also receive information regarding the grid 16 and/or the local buses, substations and networks from an energy management system (not shown). The WPP 12 is capable of altering its power or current output in reaction to commands received from the PPC 22.

In order to efficiently regulate the output of the WPP 12 in relation to the main grid 16, the WTG controllers 15 and PPC 22 rely on high-frequency monitoring data from a plurality of data sources within the WPP 12. This real-time monitoring data is useful in understanding the instantaneous behaviour WPP 12. By high-frequency it is meant that the data is monitored at a rate of between 1 Hz and 1 KHz.

The data sources comprise individual sensors or sensor sets, which comprise a plurality of individual sensors, that sense parameters useful in understanding the operation and state of the WPP 12. For example, each individual WTG 14 is a data source and incorporates a sensor set (not shown in FIG. 1). Example sensors within a WTG 14 may be, for example, sensors configured to collect blade load data, electrical power data, wind speed data, structural data about the WTG tower and nacelle, and component data. The skilled person will be familiar with the sensors within a WTG 14, and further examples of sensors will not be provided. Other data sources within the WPP 12 include sensors separate from the WTGs 14 that monitor the local grid 19 and other WPP-connected components within the WPP 12 such as a STATCOM or battery energy storage system as appropriate.

While the PPC 22 and WTG controllers 15 rely on instantaneous data, and particularly data from normal operation, it is important to also understand unusual and unexpected events, the circumstances that may have contributed to them, and the reaction of the WPP 12 to these events. The events may include under- or over-frequency events, high- or low-voltage events, detection of arcs, temperature spikes, electrical anomalies, high wind instances, breaker triggering, and communications failures.

In conventional systems, if a WTG logs an event, the associated WTG controller accesses data stored locally within the turbine and logs this data together with data about the event. As noted above, this approach is inefficient and only captures local data. For example, if the WTG causes an event but the event does not occur at the WTG, then the data from that WTG won't be logged. Similarly, if an external event occurs, the WTG's data is not stored in these conventional systems even if it may be pertinent to the subsequent analysis of the event.

Therefore, in the present embodiment of FIG. 1, a data collection system 36 is provided. The data collection system 36 is a centralised, plant-level system, and is separate from the individual WTGs 14. This is in contrast to the current implementations for data collection, where the systems are integrated into WTGs and are de-centralised.

The data collection system 36 is configured to receive monitoring data from data sources within the WPP 12. The data collection system 36 is also configured to receive trigger signals from one or more trigger sources. To illustrate this, in FIG. 1, the data collection system 36 is shown as being connected to the data feed between the WPP 12 and the PPC 22, although it will be appreciated that in reality the data collection system 36 may be positioned anywhere in relation to the WPP 12 provided it is arranged to receive data input from the data sources of the WPP 12 and trigger signals from one or more trigger sources. In some embodiments, therefore, the data collection system 36 may be incorporated within the PPC 22.

Figure 2:
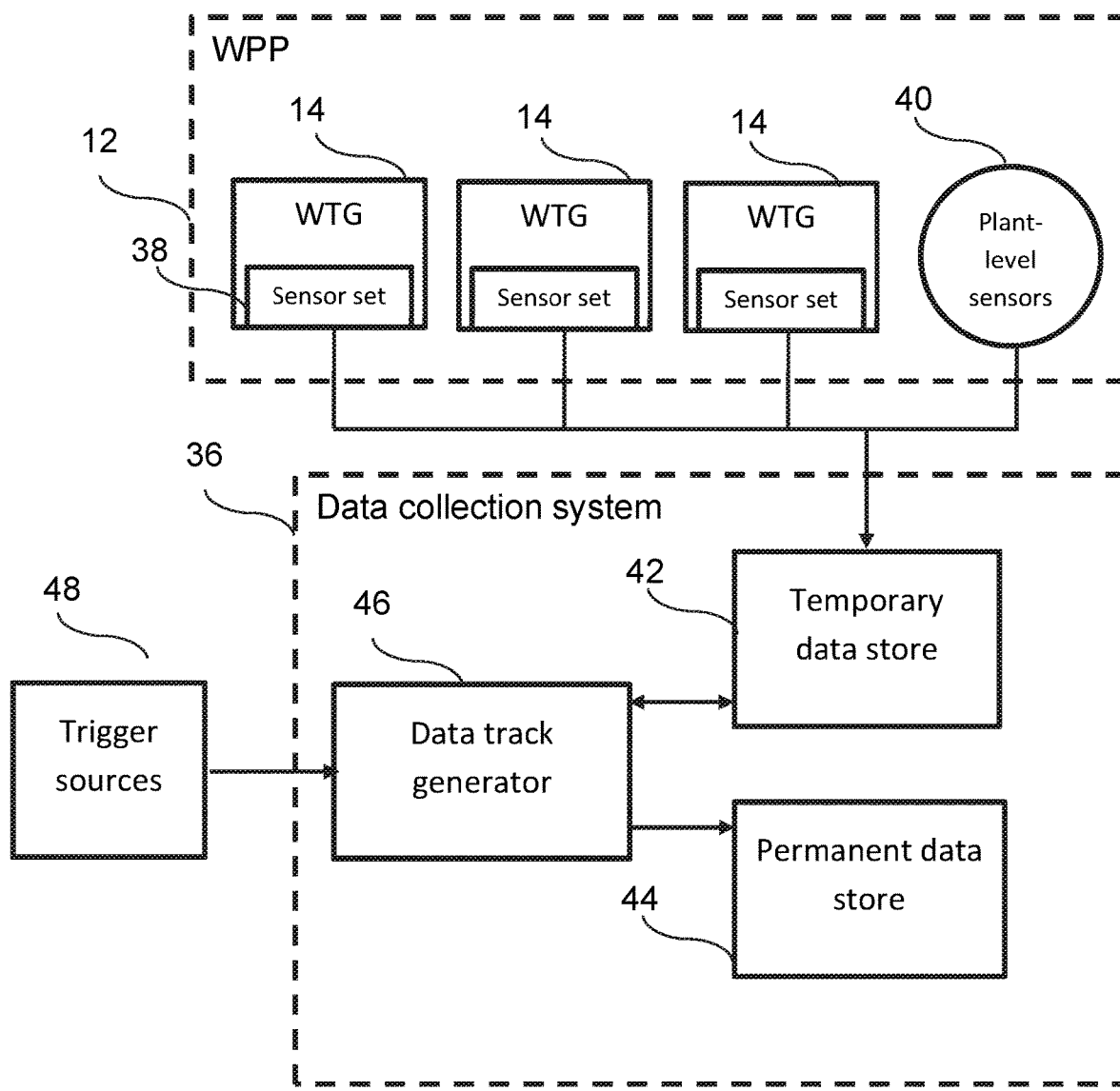
FIG. 2 shows a schematic representation of a data collection system according to an embodiment of the present invention.

To further expand upon the operation and the architecture of the data collection system 36, FIG. 2 schematically illustrates the data collection system 36 in more detail, along with its connection to the WPP 12. In FIG. 2, the WPP 12 is illustrated in terms of data sources. Therefore, the WTGs 14 are shown, as are the sensor sets 38 within the WTGs 14. Sensors of the WPP 12 that are different to the sensors in the sensor sets 38 of the WTGs 14 are also depicted, and will here be referred to as plant-level sensors 40. These plant-level sensors 40 are generally considered to be separate from the WTGs 14, although for convenience of location they may be incorporated into the WTGs 14 in some circumstances.

The data collection system 36 includes a temporary data store 42, a permanent data store 44, and a processor in the form of a data track generator 46. Although the term 'permanent' is used here in relation to the data store 44, the use of the term 'permanent' is to indicate that the data is stored in a less temporary manner than in the temporary data store, is non-volatile, and thus permits later analysis of the data. Accordingly, wherever 'permanent' is used herein, this should be read as being less temporary than the temporary storage, to permit subsequent analysis to be performed.

The temporary data store 42, as its name suggests, is a memory location for temporarily storing data. In the present embodiment, this temporary storage is provided in the form of one or more circular buffers. In other embodiments, the temporary data store may comprise any form of temporary memory or data storage, including other forms of buffer. As will be familiar to the skilled person, a circular buffer manipulates data in a first-in-first-out (FIFO) system, so that data entries or 'blocks' received by the buffer are cycled through it and eventually replaced when the reach a certain age. A circular buffer overwrites the oldest blocks with new blocks.

Within the temporary data store 42, a plurality of circular buffers (not shown) are provided, with one buffer provided per data source from which data is received. The temporary data store 42 may therefore be considered to operate as a cache. Each circular buffer is configured to hold a predetermined number of blocks, corresponding to a predetermined length of time based on the measurement frequency of the sensors of the data source for which the buffer is provided. In some embodiments, each buffer is configured to hold 10 minutes of data. In other embodiments, each buffer may be configured to hold between 1 and 30 minutes or more of data. In some embodiments, each buffer may be configured to hold more than 24 hours of data, with some buffers having lengths of many days or weeks.

As depicted in FIG. 2, the temporary data store 42 is configured to receive input from the data sources 14, 40 of the WPP 12. The input is provided in the form of a continuous, real-time or substantially real-time streams of data at high-frequency from the data sources 14, 40. In other words, monitoring data sensed by the sensors 38, 40 in the WTGs 14 and at a plant level is streamed directly to the temporary data store 42. If more data sources are added, and/or data sources are updated, the temporary data store 42 may be also updated to permit input to be received from the new or updated data sources.

The temporary data store 42, upon receiving the data from the sensors 38, 40, temporarily stores the data as a block in the buffer along with metadata. The data is stored as it is received, i.e. in the same format and at the same temporal resolution; there is no re-sampling of the data. This means that the data is sampled at a particular sampling frequency or temporal resolution, and is received at that particular frequency by the temporary data store. The metadata may include a timestamp and an identifier from which the type of data can be derived. The identifier may comprise a sensor identification code and/or a source identifier. The sensor identification code indicates the type of sensor that gathered the data. The provision of a source identifier enables individual identification of data source, i.e. which turbine the sensor is provided in. As the source identifier is specific to a data source, the source identifier combined with a sensor identification code permits the exact origin of the data to be pinpointed. In other embodiments, the sensor may have a unique identifier so that no source identifier is required. In some embodiments, both the source identifier and the sensor identifier are a combination of unique identifiable elements, so that information about the source/sensor can be derived whilst avoiding any confusion between sources and sensors.

The metadata may be assigned to the data as it is received at the temporary data store 42, or may be tagged by the relevant sensor itself upon capture of the data. In other embodiments, the metadata may be assigned to the data elsewhere in the system, i.e. between the sensor and temporary data store. In other embodiments, the metadata may be assigned between the temporary data store and permanent data store.

While the temporary data store 42 is continuously receiving and overwriting data in the buffer, the data track generator 46 awaits inputs, as shown in FIG. 2, from one or more external trigger sources 48. The input to the data track generator 46 from the trigger sources 48 is a trigger signal. A trigger signal input to the data track generator 46 is generated by a trigger source in response to a triggering event.

Triggering events are events for which data collection is desired. As already noted, some conventional wind turbine systems already capture data for events that occur internally. However, in the context of this application, triggering events are any events that can be classified as abnormalities within the power system or other extraordinary occurrences outside of the power system. Triggering events may be events identified within the WPP 12, from external to the WPP 12 such as from the main grid 16, the connecting network 18, or from a different external source that is not part of the power system whatsoever.

Accordingly, a trigger source 48 is any device or system capable of determining that a triggering event has occurred and outputting a trigger signal to the data track generator. Therefore, trigger sources include both data sources and non-data sources. A non-exhaustive list of trigger sources includes: WTGs 14, sensors on the local grid of the WPP, other plant-level sensors, sensors on the main grid and/or connecting network, the PPC 22, other computer systems of the power system such as the TSO or SCADA, and other sources that are not necessarily data sources such as circuit breakers or other non-data-producing devices incorporated within the power system. Other sources may include a weather-monitoring system, or a trigger device that is manually operable. The data collection system itself may in some circumstances act as a trigger source.

To expand further, the trigger event may comprise an electrical anomaly or an exceedance of an electrical parameter. Where a WTG 14 is the trigger source, trigger events comprise: high wind; electrical anomalies; temperature spikes, such as in the chopper circuit; detection of an arc; tripping of a main breaker; degradation of a component within the WTG detected by a condition monitoring system; lightning strike; other extreme weather conditions; and operation of systems associated with those extreme weather conditions, such as de-icing operations and ice detection. Within the WPP 12, trigger sources may generate a trigger signal in response to one or more of the following events: electrical anomalies; failure in feed lines; over- or under-production of active or reactive power; tripping of a circuit breaker; and disconnection. Within the main grid 16, trigger sources may generate a trigger signal in response to: over- or under-frequency events; power (either reactive or active) set point change; low- or high-voltage events; and/or a request that results in an abnormally high ramp rate. Some of these grid-related trigger sources are specified to identify abnormal operating conditions, while others are identified to ensure accountability in grid compliance. A further trigger source may be the quality of the grid. Computer systems, such as a SCADA, the PPC 22, the WTG controller 15, or other park controllers, may cause trigger signals in response to communication failures with devices under their control; conditional and cumulative events; and/or any other event where the relevant trigger source has not created a trigger signal. A further trigger source may comprise a timer. At regular intervals, the timer may cause a trigger signal so that data is gathered for a predetermined period of time at the regular interval. For example, 60 seconds of data may be gathered every hour to ensure compliance of the plant or generators with regulations.

In order to create a trigger signal, the one or more trigger sources compare events with one or more predetermined thresholds or criteria. For example, a WTG 14 acting as a trigger source may output a trigger signal in response to high wind. High wind is determined by the WTG based on a predetermined high wind threshold and sensor readings from a WTG-mounted anemometer. If the data from the anemometer indicates that the threshold is exceeded, the WTG outputs a trigger signal. For non-data-producing devices, such as a circuit breaker, the threshold may be thought of as a criteria. For example, a circuit breaker acting as a trigger source may create a trigger signal when it is tripped and opens.

The data track generator 46 is configured to receive event trigger signals from the plurality of trigger sources 48. In response to receiving a trigger signal, the data track generator 46 is configured to cause data from the temporary data store 42 to be stored in the permanent data store 44. In doing so, data that is relevant to the event for which the trigger signal was created is stored in a less temporary manner so that root-cause analysis on the event can be performed or a compliance report generated. As the temporary data store 42 stores data from a plurality of WTGs 14 and other park-level sensors 40, the data stored in the permanent data store 44 provides an overview of the operation of the WPP 12 as a whole during the event, rather than just the source of the event, as would be the case in conventional systems. Thus, more useful analysis can be performed than was previously possible.

In order to cause the transfer of data from the temporary data store 42 to the permanent data store 44, the data track generator 46 generates a data track for the event in response to the trigger signal from the trigger source 48. In the context of this application, a data track is a bundle of data that is timestamped and metadata indicating the event that triggered the creation of the track. Data tracks are useful in ensuring that the data for an event is stored in a single place. The data track allows grouping of data without having to alter it, thereby ensuring that the analysis can be performed on the root data. This is in contrast to conventional arrangements, where decentralised systems send data in different formats, which need to be altered to enable any form of coherent inspection.

The data track generator 46 creates the data track with the event metadata attached. The data track generator 46 accesses the temporary data store 42 and extracts relevant data to include in the data track. The extracted data is deemed relevant based on the time at which it was recorded, relative to the event, and the data source.

To extract data based on time, the data track generator 46 determines an event time period for the event based on the event timestamp. The event time period is a period of time around the timestamp time. Accessing data before and after the event is useful for determining the case and effect of events on the WPP 12. It is envisaged that the time period will be a predetermined length or number of samples, but in other embodiments the period may be variable depending upon the event type or based on other criteria such as available storage in the permanent data store 44.

The data track generator 46 extracts data from particular data sources in order to extract the most relevant data from the temporary data store 42. In order to select the most relevant sources, the data track generator 46 compares the trigger source 48 or identifier within the trigger signal with a database to determine the data sources to extract data for. In some embodiments, data from all sources may be selected.

Having determined the event time period and the data sources, the data track generator 46 reads the entries within the time period for the relevant data sources from the temporary data store 42 and into the bundle of the data track.

Once the data track has been completed, the data track generator 46 writes the track to the permanent data store 44. The permanent data store 44 holds the data track in permanent storage for subsequent access and analysis. The permanent data store 44 is accessible by external users, and may be configured to be writeable by the data track generator 46 only. The permanent data store 44 may therefore be configured as a public, read-only data store for the WPP 12.

The temporary data store 42, data track generator 46, and permanent data store 44 are separate entities in the embodiment of FIG. 2. The separation of these components of the data collection system 36 permits the generation and processing of multiple tracks simultaneously by the data track generator 46. This is permitted because the tracks are processed and generated sequentially by the data track generator 46 and also because the data track generator 46 generates the tracks after the data is made available in the temporary data store 42. Thus, the data is past data accessed by the data track generator 46 and formed into data tracks. By decoupling these entities, the time for producing data tracks is reduced and the size of the buffer in the temporary data store can be reduced because the data track generation time is quicker.

Figure 3:
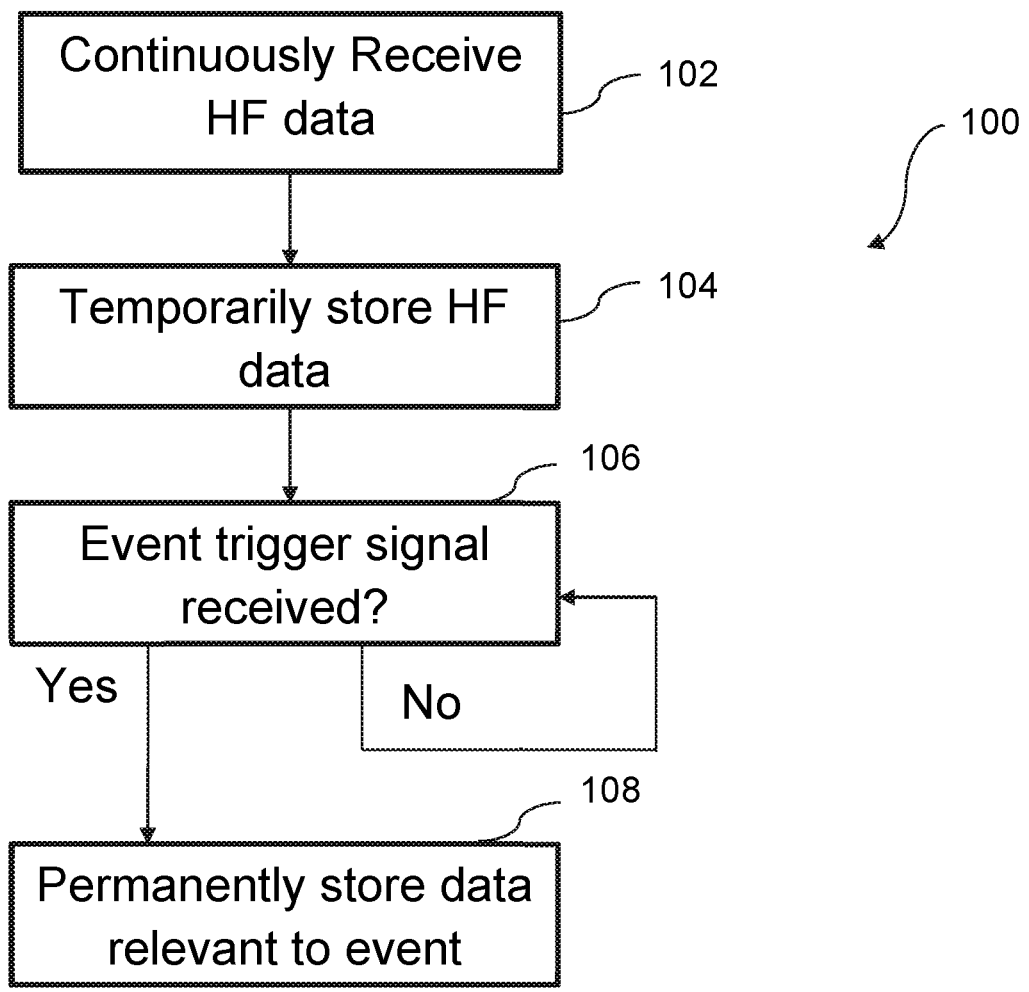
FIG. 3 shows a flow chart governing a method of collecting data from a wind power plant.

While the above description is concerned with the data collection system 36, the invention may also be framed as a method for collecting data from a wind or other renewable energy power plant, including hybrid plants. The method has already been described in detail in relation to FIG. 2 and interwoven with the description of the system. However, for completeness, FIG. 3 illustrates a general method 100. The method comprises the steps of: receiving 102 high-frequency data from a plurality of data sources within the wind power plant; temporarily storing 104 the high-frequency data; and, in response to receiving 106 a trigger signal relating to an event, permanently storing 108 temporarily stored data relevant to the event for subsequent analysis.

It will be appreciated that various changes and modifications can be made to the present invention without departing from the scope of the present application.

The invention claimed is:

1. A data collection system for a renewable energy power plant comprising a plurality of renewable energy generators, the system comprising:
   a temporary data store in communication with the renewable energy generators, and configured to:
      receive a stream of data from at least two of the plurality of renewable energy generators; and
      temporarily store the received data;
   a permanent data store for storing data for subsequent analysis;
   a processor in communication with the temporary and permanent data stores and a plurality of trigger sources, the processor being configured to, in response to receiving a trigger signal from one of the plurality of trigger sources, cause temporarily-stored data from the temporary data store to be stored in the permanent data store;
   one or more generator-level sensors associated with the renewable energy generators; and
   one or more plant-level sensors that are separate from the one or more generator-level sensors,
   wherein the temporary data store is in communication with the one or more generator-level sensors and the one or more plant-level sensors, and wherein the temporary data store is configured to receive the stream of data directly from the one or more generator-level sensors and the one or more plant-level sensors.

2. The data collection system of claim 1, wherein the temporary data store is in communication with one or more sensors of the renewable energy power plant, the one or more sensors being separate from the renewable energy generators, and the temporary data store is configured to receive a stream of data from the one or more sensors.

3. The data collection system of claim 1, wherein the temporary data store is configured to continuously receive the streams of data.

4. The data collection system of claim 1, wherein the temporary data store comprises at least one buffer.

5. The data collection system of claim 4, wherein the temporary data store comprises a buffer for each data source from which data is received by the temporary data store.

6. The data collection system of claim 1, wherein the temporary data store is configured to store the data at the same temporal resolution as it is received.

7. The data collection system of claim 1 wherein the processor is configured to cause data to be stored in the permanent data store at the same temporal resolution as it is stored in the temporary data store.

8. The data collection system of claim 1, wherein the temporary data store is configured to store metadata with the data, and wherein the metadata comprises a data timestamp.

9. The data collection system of claim 8, wherein the trigger signal comprises an event timestamp, and wherein the processor is configured to:
   determine an event period based on the event timestamp; and
   cause data from the temporary data store having a data timestamp within the event period to be stored in the permanent data store.

10. The data collection system of claim 9, wherein the event period comprises timestamps from before and after the event timestamp.

11. The data collection system of claim 8, wherein the metadata comprises a data identifier with the data, the data identifier enabling identification of the source of the data and/or the data type.

12. The data collection system of claim 11, wherein the trigger signal comprises an event identifier, and wherein the processor is configured to:
   determine one or more data identifiers based on the event identifier; and
   cause data from the temporary data store having the determined data identifiers to be stored in the permanent data store.

13. The data collection system of claim 1, wherein the processor, temporary data store, and permanent data store are separate entities.

14. The data collection system of claim 1, wherein the trigger source comprises one of: a renewable energy generator; a renewable energy power plant sensor; a connecting network sensor; a controller; an external power network sensor, a non-data-producing device; or the data collection system.

15. A system, comprising:
a wind power plant comprising a plurality of wind turbine generators connected to a power network;
a power plant controller communicatively coupled with the wind power plant by way of a data feed;
one or more generator-level sensors associated with the plurality of wind turbine generators;
one or more plant-level sensors that are separate from the one or more generator-level sensors; and
a data collection system arranged along the data feed, the data collection system comprising:
a temporary data store in communication with the plurality of wind turbine generators by way of the data feed, and configured to:
receive a stream of data from at least two of the plurality of wind turbine generators, wherein the temporary data store is in communication with the one or more generator-level sensors and the one or more plant-level sensors, and wherein the temporary data store is configured to receive the stream of data directly from the one or more generator-level sensors and the one or more plant-level sensors; and
temporarily store the received data;
a permanent data store for storing data for subsequent analysis; and
a processor in communication with the temporary and permanent data stores and a plurality of trigger sources, the processor being configured to, in response to receiving a trigger signal from one of the plurality of trigger sources, cause temporarily-stored data from the temporary data store to be stored in the permanent data store.

16. A method, comprising:
providing a wind power plant comprising a plurality of wind turbine generators connected to a power network, wherein the wind power plant further comprises one or more generator-level sensors associated with the plurality of wind turbine generators and one or more plant-level sensors that are separate from the one or more generator-level sensors;
providing a power plant controller communicatively coupled with the wind power plant by way of a data feed;
providing a data collection system arranged along the data feed;
receiving, by a temporary data store of the data collection system, a stream of data from at least two of the plurality of wind turbine generators;
temporarily storing, by the temporary data store, the stream of data, wherein the temporary data store is in communication with the one or more generator-level sensors and the one or more plant-level sensors, and wherein the temporary data store is configured to receive the stream of data directly from the one or more generator-level sensors and the one or more plant-level sensors;
receiving, by a processor of the data collection system, a trigger signal from at least one of a plurality of trigger sources; and
causing, by the processor based on the trigger signal, the stream of data stored temporarily in the temporary data store to be stored in a permanent data store of the data collection system.

* * * * *